Figure 1:
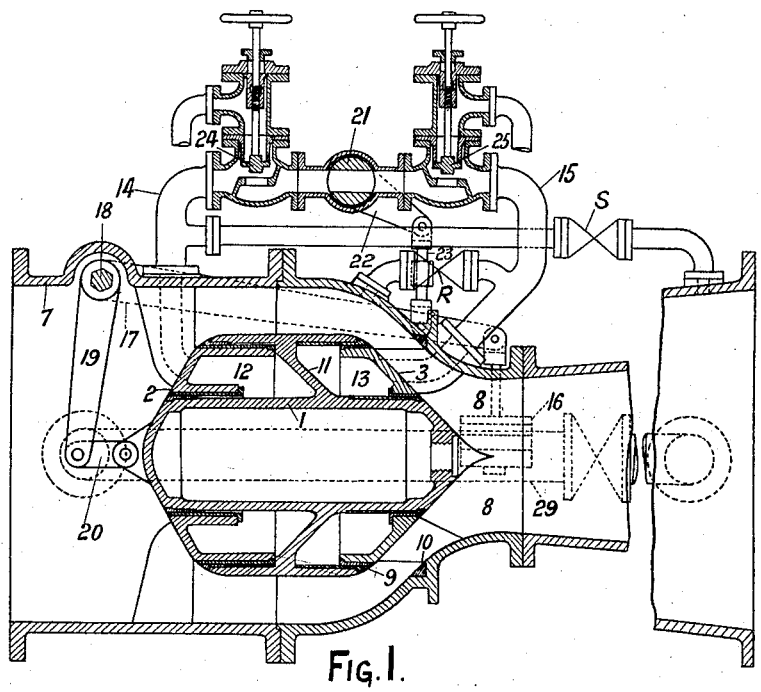

Nov. 26, 1929.  O. A. PRICE  1,736,938

AUTOMATIC SELF CLOSING VALVE

Filed Aug. 30, 1928  3 Sheets-Sheet 1

INVENTOR.
O. A. PRICE.
By
ATTYS.

Nov. 26, 1929.  O. A. PRICE  1,736,938
AUTOMATIC SELF CLOSING VALVE
Filed Aug. 30, 1928  3 Sheets-Sheet 2

INVENTOR.
O. A. PRICE.
By Fetherstonhaugh Co.
ATTYS.

Nov. 26, 1929.   O. A. PRICE   1,736,938
AUTOMATIC SELF CLOSING VALVE
Filed Aug. 30, 1928   3 Sheets-Sheet 3
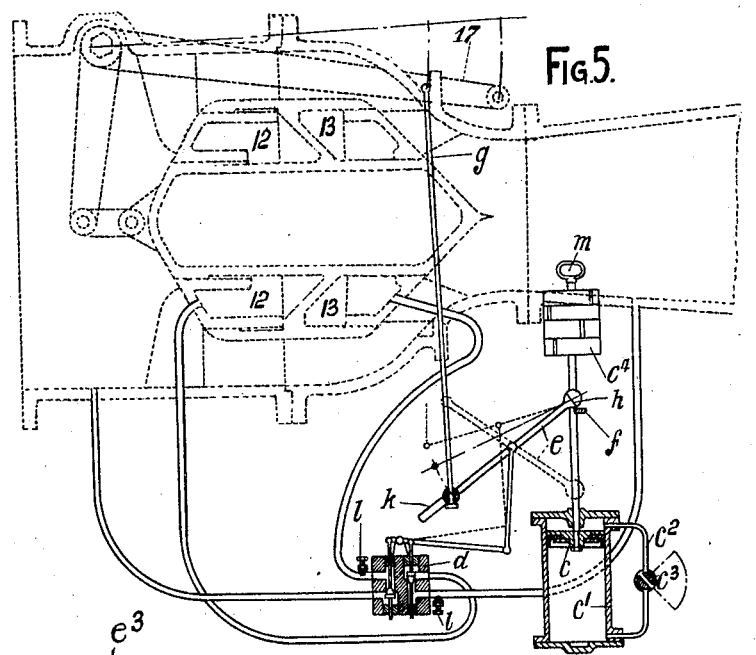
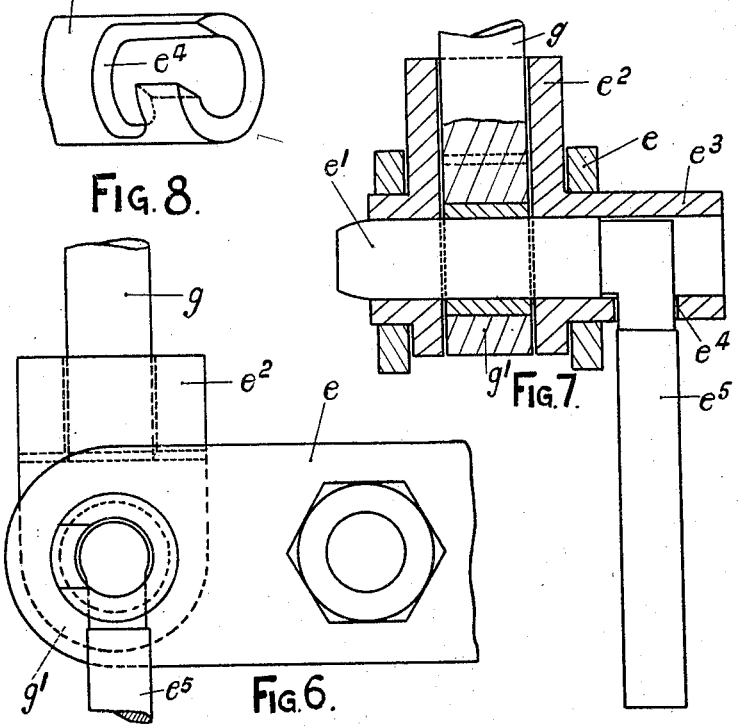
INVENTOR.
O. A. PRICE.
ATTYS.

Patented Nov. 26, 1929

1,736,938

UNITED STATES PATENT OFFICE

OWEN ALFRED PRICE, OF KILMARNOCK, SCOTLAND

AUTOMATIC SELF-CLOSING VALVE

Application filed August 30, 1928, Serial No. 303,029, and in Great Britain September 1, 1927.

This invention relates to automatic self-closing valves and is an improvement in or modification of the invention forming the subject of the prior Letters Patent 1,629,637, dated 24th May, 1927.

In the specification of the said prior Letters Patent there is described an automatic self-closing valve including a plunger mounted for movement in an annular body spaced from the wall of a channel in the vicinity of a throat or zone of low pressure, less than that in the main part of the channel; the plunger forming with said body a structure of stream-line form and being equipped with a piston the side of which nearer to the low pressure zone is open to the higher pressure in the main part of the channel and the opposite side of which is open to the lower pressure in said zone.

In the construction described in the prior specification the cross sectional area of the plunger piston was limited by the condition that during fluid flow the total hydraulic force acting on the piston in the opening direction was necessarily less than that acting on the plunger in the closing direction so that the effective area of the annular piston was less than the effective area of the plunger.

The present invention, while retaining the automatic closing properties of the valve described in the said prior specification, obviates the limitation aforesaid, provision being made whereby the opposite sides of the piston are subject to the same pressure in the open position of the valve, so that the piston area may be greater than the plunger area, thereby permitting the employment when required of total forces on the piston which are capable of overcoming the forces on the plunger, thus increasing the range of usefulness of the valve as well as permitting effective control of the valve by the retarding means during closure.

Broadly, the invention consists in an automatic self-closing valve including an obturating member interposed in a channel in the vicinity of a zone of low pressure, less than that in the main part of the channel, said obturating member comprising a plunger exposed at its opposite ends to the pressure in the main part of the channel and in said zone and provided with an external piston on opposite sides of which equal pressures are maintained in the open position of the valve during normal flow, said plunger and piston forming parts of a body of stream-line form spaced from the wall of the channel, and a counterweight or the like serving normally to hold the valve open in stable position.

Further, the invention comprises means whereby the cushion chamber or compartment in front of the piston may be fed with pressure water from the main during the closing movement of the main valve and the hydraulic forces available utilized for retarding the closing movement and/or whereby the compartment to the rear of the piston may be opened to a low pressure region or to exhaust.

As is understood, wide variations may be counted on in the permissible closing time for different pipe lines. In some cases it may only be necessary to apply a small retardation additional to that otherwise presented by the cushion chamber without respect to any particular period of time, whereas in other cases it may be necessary to ensure that the time of closing will not be less than a predetermined interval. In all cases the time of closing should not greatly exceed a limit such that undue loss of water is avoided and damage due to flooding is reduced to a minimum, it being understood that where exact timing is required the means for imposing additional retardation must be capable of being timed independently so as not to be effected by variation in leakage spaces arising in manufacture or due to wear within the main valve.

Figure 2:
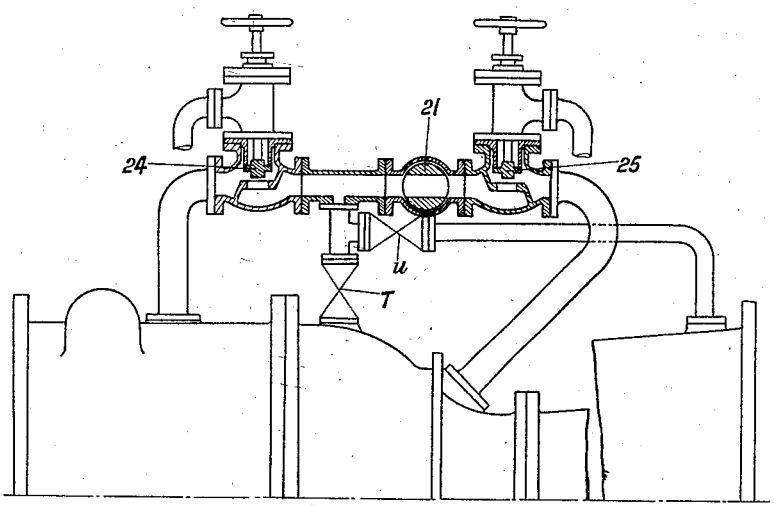
Figure 3:
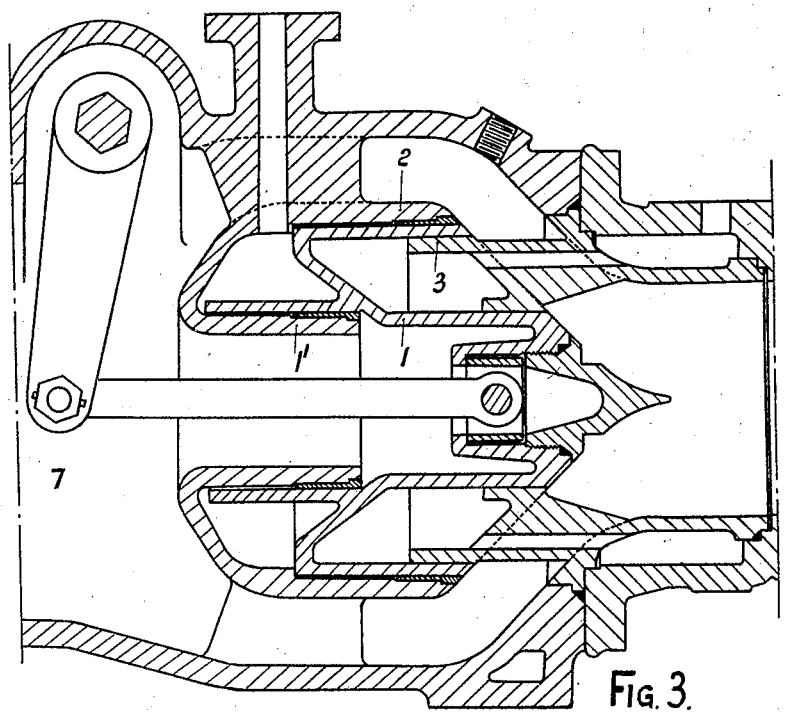
Figure 4:
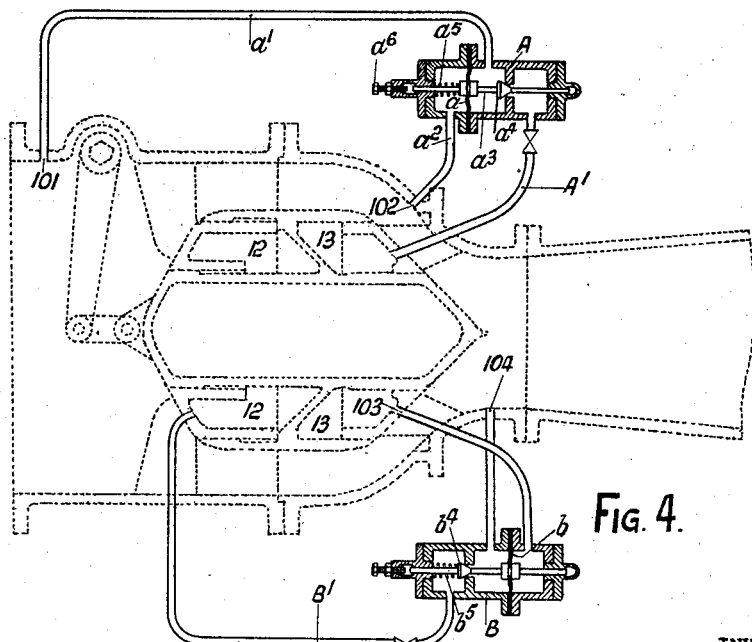

Fig. 1 of the accompanying drawings is a vertical section showing diagrammatically an automatic self-closing valve embodying the present invention. Fig. 2 is a like view illustrating a variant. Fig. 3 is a vertical section showing another variant. Fig. 4 shows diagrammatically a valve with closing means that is entirely hydraulic in its action and is capable of approximate adjustment.

Referring to Fig. 1, and contrasting it with that of the said prior specification, it will be seen that in the present Fig. 1 the ratio of the diameter of the plunger 1 to that of the stream line structure as a whole is less than in the previous arrangement and that the form of the piston 11 is modified so that it constitutes the wall of the central portion of the stream line structure completed by the spaced body members 2, 3.

As with the present arrangement the piston area may be greater than the plunger area, there may be employed when required total forces on the piston 11 which are capable of overcoming the forces on the plunger.

As shown, the compartments 12, 13 on opposite sides of the piston are connected by a loop connection 14, 15 in which is fitted the throttle valve 21 having connections 22, 23 with a weighted lever 17 on a spindle 18 having connections 19, 20 with the plunger 1.

In the branch 14 of the loop connection between the throttle valve 21 and the compartment 12 is a double-seated valve 24 controlling a connection to exhaust and adapted in one position to cut off communication between the compartments 12, 13.

In the branch 15 of the loop connection between the throttle valve 21 and the compartment 13 is a double-seated valve 25 controlling a connection to exhaust and adapted in one position to cut off communication between the compartments 12, 13.

From the branch 14 a connection fitted with a valve S is led to a point of the main channel downstream of the valve seat 10 with which co-operates a valve face 9 formed on the piston.

From the branch 15 a connection fitted with a valve R is taken to a point of the main channel upstream of the valve seat 10.

29 denotes the usual valved by-pass which may be fitted if desired.

It will be observed that the main valve presented by the plunger can be kept shut against pressure from the downstream side as well as from the upstream side; further, the main valve can be opened without the necessity for the provision of a by-pass valve to equalize the pressure on the two sides of the main valve before opening.

Constructed as illustrated in Fig. 1 the device is less susceptible to manufacturing errors, such as incorrect widths of cored passages, than the device of the prior specification. Practical experience has shown that the width of the cored passage in the immediate vicinity of the valve seat in the prior construction is liable to vary with different castings and consequently the pressure at the circumference of the plunger is not identical with that at the throat 8 with the result that adjustments of the weight loading 16 are required and exact predetermination of the valve behaviour is uncertain. In the arrangement of Fig. 1 the front end of the plunger is practically in the throat, which is practically free from casting variations, so that the behaviour of the valve can be predetermined by calculation with more assurance.

Referring again to Fig. 1 it will be seen that the back of the plunger 1 is subject to the full pressure in the main 7 and that the front of the plunger is subject to the low pressure in the throat 8. The two compartments 12 and 13 being connected by the valved connection 14, 15, it follows that when all the valves are open and the main valve is in the open or working position the two sides of the piston 11 are subject to the same hydrostatic pressure. The closing force during automatic action or during pipe flow is thus determined solely by the difference of pressure between the two ends of the plunger. To close the main valve by hand, the double-seated valve 25 is opened to exhaust, thus shutting off the branch 14 and emptying the chamber 13, pressure water entering the chamber 12 by leakage from the main 7. When it is required to hold the main valve closed against downstream pressure with the upstream main empty, the valve S is opened to admit pressure water to the chamber 12. To open the main valve by hand when the downstream main is empty, the by-pass 29 is first opened to fill the main and to equalize the pressure between the two ends of the plunger; the double-seated valve 24 is then opened to exhaust, thus shutting off the branch 15 and emptying the chamber 12, pressure water entering the chamber 13 by leakage from the downstream main. In cases where no by-pass 29 is fitted, the valve R is opened to admit upstream main pressure to the chamber 13.

The pipe arrangements may be varied according to the particular requirements of each individual case without affecting the principle of the invention. For instance, instead of being connected by a loop, the compartments 12, 13 may be piped to any points of equal pressure, or to a single point in the main channel, or, if desired, to an external source of pressure water. In the alternative example shown in Fig. 2 the compartments are connected to a common point on the channel through the valve T. It will be seen on consideration of said Fig. 2 that, during hand manipulation of the valve, pressure supply to the operating compartment is by way of the connection through the valve T instead of, or in addition to, the supply due to leakage as in the arrangement of Fig. 1 above described. In order to hold the main valve closed against downstream pressure, the valve T is closed and the valve U opened.

It will be understood that the drawings are diagrammatic and that details forming no part of the invention, such as a by-pass for the throttle valve 21, are omitted in the interest of clearness of illustration.

In order to reduce static friction by reducing the weight causing this friction the obturating member or plunger may be constructed as shown in Fig. 3.

Referring to Fig. 3 it will be seen that the plunger 1 has the rear half of its skirt cut away, the skirt now sliding over the fixed member 3 and under the projecting cylindrical portion of the fixed member 2.

The interior of the plunger 1 is open to the main 7; the rear end of the plunger sliding over a stationary cylindrical projection 1' integral with the member 2.

It will be observed that the large diameter flange-joint at the centre of the annular structure of the previously described constructions is eliminated.

Alternative constructions of the plunger will immediately occur to the practical designer.

In Fig. 4 there are shown separate devices for controlling the feeding of the compartment or cushion chamber 13 and for preventing the building up of pressure in the compartment 12, it being understood that either one of the devices may be employed alone, or that both may be employed simultaneously.

The first of these devices includes a movable member (diaphragm, piston or the like) opposite sides of which are connected to regions in the water spaces where the pressures are approximately equal during normal flow (with the valve full open) but where a substantial difference of pressure is set up during the closing movement of the valve, the pressure equalizing again when the valve is shut, the resulting movements of the movable member being utilized to open and reclose the compartment 12 or the compartment 13.

In the embodiment shown in Fig. 4 one side of a diaphragm chamber A is connected by a pipe $a'$ to the main at 101 and the other side of said chamber is connected by the pipe $a^2$ to a point 102 near the main valve seat, these two points being at approximately equal pressures during normal flow and at exactly equal pressures when the water column is static and the main valve closed. During closing, as the main valve approaches its seat, a high velocity is reached at the point 102, resulting in a considerable local fall of pressure which is transmitted through the pipe connection $a^2$ to the rear side of the diaphragm $a$. The excess pressure on the forward side therefore moves the diaphragm $a$, with its spindle $a^3$ to the left, thus opening the small conical valve $a^4$ and admitting high pressure by way of the valved pipe A' to the compartment or cushion chamber 13 whereby to retard the main valve. $a^5$ denotes a spring that normally holds the valve $a^4$ on its seat against any small pressure difference. $a^6$ denotes a stop adjustable to determine the lift of the conical valve $a^4$.

If only one diaphragm device such as above described be provided, the main valve cannot be brought to a standstill in partially open position even with the conical valve $a^4$ wide open and a full supply entering the compartment 13, because the pressure in the chamber 12 can build up to the full pipe pressure establishing with the addition of the pipe pressure acting on the end of the plunger a total closing force greater than any possible opposing force in the compartment 13. Desirably there is provided, in addition, a second diaphragm device comprising a diaphragm chamber having connections to the main and to the compartments on both sides of the plunger piston whereby it is rendered possible further to retard the main valve before closure is complete.

As shown in said Fig. 4, one side of the diaphragm chamber B is connected to the compartment 13 at 103 and the other side to the throat or constricted part of the main at 104. The conical valve $b^4$ corresponding to the valve $a^4$ controls a valved connection B' between the left hand side of the diaphragm chamber B and the chamber 12 behind the plunger piston. In normal operation with the main valve open the valve $b^4$ is held closed by the spring $b^5$. When the main valve closes due to a pipe burst, the pressure at the throat will fall very considerably during closing, and may in fact fall to atmospheric pressure when the valve is shut if the burst is near at hand. As the cushion pressure in the compartment 13 is maintained, the diaphragm $b$ is forced to the left, thus opening the conical valve $b^4$ and draining the chamber 12 to the low pressure in the throat and thereby preventing the building up of pressure in the compartment 12.

It will be realized that with the provision of these diaphragm devices, either separately or in combination, retardation is applied automatically as and when required after the closing of the cushion valve 21; further the diaphragm-controlled connections are self-closing when the main valve closes so that no openings are left for the escape of water. With the provision made for adjustment the amount of retardation may be controlled over a useful range.

In Fig. 5 is shown an arrangement incorporating a retarding device including a dashpot piston $c$ mechanically connected to the main valve and operating in a cataract cylinder $c'$ having a controllable connection $c^2$ between its ends whereby to regulate the dashpot action and thereby the time occupied in the closing movement of the main valve. In this arrangement the dash-pot mechanism has a mechanical connection with a controlling or retarding valve device $d$ operable in the closing movement of the main valve to open the compartments 12 and 13, respectively, to low and high pressure regions, such mechanical connection including a floating lever $e$ of which the end connected to the dash-pot piston $c$ moves at a predetermined rate and the opposite end follows up at a corresponding rate while the floating lever tilts about the virtual centre constituting the point of attachment of the lever to the retarding valve device $d$.

In said Fig. 5 the main valve is shown full open, the retarding gear being represented by full lines in position ready to come into action automatically as the main valve closes. The retarding valve $d$ is shown shut, being adapted when opened (during the closing movement of the main valve) to connect the compartment 13 to a high pressure point of the main and to connect the compartment 12 to a point of rapidly decreasing pressure below the main valve.

In practice, the cataract cylinder $c'$ is filled with glycerine or oil, and the adjustable throttle $c^3$ in the connection $c^2$ set so that the piston $c$ occupies the necessary time in falling, the weight load $c^4$ being borne by a fixed latch plate $f$ when the gear is set ready for automatic operation.

As the main valve closes, the lever 17 rises, carrying with it the pull rod $g$ and raising the floating lever $e$, tilting it about the pivot temporarily held on the latch plate. This tilting movement at the pivot releases the moving latch $h$, thus throwing the weight load on to the piston $c$ and initiating the slow downward travel of the controlled end of the floating lever $e$. The main valve continues to close quickly, and shortly after the latch is released the cushion valve 21 closes, thus isolating the compartments 12 and 13 and permitting the establishment of different pressures in these compartments. The retarding valve $d$ still continues to open, as the main valve moves, thus raising the pressure in the compartment 13 and lowering the pressure in the compartment 12, thereby steadily retarding the main valve until it is creeping at a dead slow rate and full control is taken by the retarding valve, the opposing force, due to the high pressure in the compartment 13 and the lower pressure in the compartment 12, being then practically equal to the closing force on the main valve. At this stage the retarding valve $d$ has reached its control position, the virtual centre of the floating lever $e$ is at its highest position, and the main valve is moving at the speed determined by the rate of travel of the controlled end of the floating lever $e$ itself under the action of the cascade device. Should the main valve tend to travel faster, the retarding valve $d$ would be opened further and the excess movement arrested, or, on the contrary, should the main valve tend to lag, the retarding valve $d$ would be partially closed by the continued lowering of the floating lever $e$ reducing the opposing effort in the compartments 12 and 13 and permitting the closing force on the back of the plunger to hasten the main valve towards its seat.

In this way the closing movement of the main valve is completed at a predetermined rate.

If desired the adjustable throttle $c^3$ can be mechanically controlled from the falling piston rod in order to set up further resistance near the end of the stroke and thus apply further retardation to the main valve.

When the main valve closes on its seat, the retarding valve $d$ is still open; the virtual centre of the floating lever $e$ is still at its control position and the piston $c$ has not completed its travel. The continued movement of the piston $c$ then lowers the floating lever $e$ by turning it about the pivot at the extremity of the pull rod $g$ thus closing the retarding valve $d$, and returning the central point (virtual centre) of the floating lever $e$ to its original position but with the floating lever now in its rest position.

The closing stroke of the main valve thus comprises a rapid initial movement, a gradual retardation, and a final dead slow movement, thus conforming with the ideal pressure for bringing a large moving column of water to rest.

Figs. 6, 7 and 8 are fragmentary detail views illustrating means whereby the sliding connection between the pull rod $g$ and the floating lever $e$ may be locked when the apparatus is set for automatic action and may be released when desired to free the retarding device from the main valve.

Referring to Figs. 6 to 8, the sliding connection between the pull rod $g$ and the floating lever $e$ may be locked or released by manipulation of a pin $e'$ which is insertible into an apertured bracket $e^2$ pivotally mounted in the lever $e$. The pull rod $g$ is slidable through the bracket $e^2$ and has at its lower end a bushed eye $g'$. One pivot $e^3$ of the bracket $e^2$ is extended and is formed with a bayonet fixing slot $e^4$ (Fig. 8) engageable with the handle $e^5$ of the pin $e'$, whereby to retain said pin in position after insertion.

It will be understood that, when the eye $g'$ is brought into register with the pin aperture, the pin $e'$ may be inserted and given a quarter turn to lock it in position.

In practice, the retarding device is thrown out of action entirely when in the bottom or rest position, and may at any time be dropped to this position (while hand-manipulation of the main valve is in progress, or for any other reason) by withdrawing the lock-pin, lifting the handle $h$ on the floating lever and thus releasing the latch or by suitable direct movement of the latch itself. To reset the retarding gear after the main valve has been re-opened by hand, it is only necessary to raise the cataract piston rod by means of the handle *m* or by a hand pump connected between the two ends of the cataract cylinder C' and arranged to force liquid from the top of the piston to the bottom and thus raise the whole falling mechanism. When closing the main valve by hand the retarding device may be employed, if desired, to complete the last stage of the closing operation. To effect this, the valve 25 would first be opened to exhaust until the main valve is about half closed; the valve 25 would then be closed and the movement completed under the control of the retarding gear. Reopening of the main valve by hand is effected with the retarding gear out of action, in the rest position.

Choke screws such as *l* or orifice plates or other throttling means may be interposed in the retarding valve connecting pipes, for adjusting or limiting the full effect of the retarding valve.

What I claim is:—

1. In combination with a fluid conduit including a zone of low pressure, less than that in the main portion of said conduit, a valve seat in the vicinity of said zone, an obturating member movable in said conduit and engageable with said seat to cut off the passage of fluid through said conduit, said obturating member comprising a plunger exposed at its opposite ends to the pressures in the main part of said conduit and in said zone and an external piston unitary with said plunger, opposite sides of which piston are exposed to equal pressures during normal flow through said conduit with said obturating member spaced from said seat, a stationary guiding structure forming with said plunger and piston a body of stream-line form spaced from the inner wall of said conduit, and means normally serving to hold said obturating member away from said seat.

2. In combination with a fluid conduit including a zone of low pressure, less than that in the main portion of said conduit, a valve seat in the vicinity of said zone, an obturating member in said conduit on the upstream side of said seat and engageable with said seat to cut off the passage of fluid through said conduit, said obturating member comprising a plunger exposed at its opposite ends to the pressures in the main part of said conduit and in said zone and an external piston unitary with said plunger, a stationary guiding structure forming with said plunger and piston a body of stream-line form spaced from the inner wall of said conduit, said structure, plunger and piston forming the enclosing walls of two compartments on opposite sides of said piston, a loop connection between said compartments, and means normally serving to hold said obturating member away from said seat.

3. In combination with a fluid conduit including a zone of low pressure, less than that in the main portion of said conduit, a valve seat in the vicinity of said zone, an obturating member in said conduit on the upstream side of said seat and engageable with said seat to cut off the passage of fluid through said conduit, said obturating member comprising a plunger exposed at its opposite ends to the pressures in the main part of said conduit and in said zone and an external piston unitary with said plunger, a stationary guiding structure forming with said plunger and piston a body of stream-line form spaced from the inner wall of said conduit, said structure, plunger and piston forming the enclosing walls of two compartments on opposite sides of said piston, a loop connection between said compartments, valve means in said loop connection, and means normally serving to hold said obturating member away from said seat.

4. In combination with a fluid conduit including a zone of low pressure, less than that in the main portion of said conduit, a valve seat in the vicinity of said zone, an obturating member in said conduit on the upstream side of said seat and engageable with said seat to cut off the passage of fluid through said conduit, said obturating member comprising a plunger exposed at its opposite ends to the pressures in the main part of said conduit and in said zone and an external piston unitary with said plunger, a stationary guiding structure forming with said plunger and piston a body of stream-line form spaced from the inner wall of said conduit, said structure, plunger and piston forming the enclosing walls of two compartments on opposite sides of said piston, a loop connection between said compartments, a valve in said loop connection, and means normally serving to hold said obturating member away from said seat, said means operatively connected to said valve.

5. In combination with a fluid conduit including a zone of low pressure, less than that in the main portion of said conduit, a valve seat in the vicinity of said zone, an obturating member on the upstream side of said seat and engageable with said seat to cut off the passage of fluid through said conduit, said obturating member comprising a plunger exposed at its opposite ends to the pressures in the main part of said conduit and in said zone and an external piston unitary with said plunger, opposite sides of which piston are exposed to equal pressures during normal flow through said conduit with said obturating member spaced from said seat, a stationary guiding structure forming with said plunger and piston a body of stream-line form spaced from the inner wall of said conduit, means normally serving to hold said obturating member away from said seat, and means for retarding the movement of said obturating members towards said seat.

6. In combination with a fluid conduit including a zone of low pressure, less than that in the main portion of said conduit, a valve seat in the vicinity of said zone, an obturating member on the upstream side of said seat and engageable with said seat to cut off the passage of fluid through said conduit, said obturating member comprising a plunger exposed at its opposite ends to the pressures in the main part of said conduit and in said zone and an external piston unitary with said plunger, opposite sides of which piston are exposed to equal pressures during normal flow through said conduit with said obturating member spaced from said seat, a stationary guiding structure forming with said plunger and piston a body of stream-line form spaced from the inner wall of said conduit, means normally serving to hold said obturating member away from said seat, means for retarding the movement of said obturating member towards said seat and means for controlling the retardation of said movement.

7. In combination with a fluid conduit including a zone of low pressure, less than that in the main portion of said conduit, a valve seat in the vicinity of said zone, an obturating member on the upstream side of said seat and engageable with said seat to cut off the passage of fluid through said conduit, said obturating member comprising a plunger exposed at its opposite ends to the pressures in the main part of said conduit and in said zone and an external piston unitary with said plunger, a stationary guiding structure forming with said plunger and piston a body of stream-line form spaced from the inner wall of said conduit, said structure, plunger and piston forming the enclosing walls of two compartments on opposite sides of said piston in which compartments equal pressures are maintained during normal flow through said conduit with said obturating member spaced from said valve seat, means normally serving to hold said obturating member away from said seat, a dash pot device including a dash-pot piston mechanically connected to said obturating member and a cataract cylinder for said dash pot piston, connections from said compartments to low and high pressure regions, a valve device controlling said connections, and an operative connection between said dash pot device and said valve device.

8. In combination with a fluid conduit comprising a zone of low pressure, less than that in the main portion of said conduit, a valve seat in the vicinity of said zone, an obturating member on the upstream side of said seat and engageable with said seat to cut off the passage of fluid through said conduit, said obturating member comprising a plunger exposed at its opposite ends to the pressures in the main part of said conduit and in said zone and an external piston unitary with said plunger, opposite sides of which piston are exposed to equal pressures during normal flow through said conduit with said obturating member spaced from said seat, a stationary guiding structure forming with said plunger and piston a body of stream-line form spaced from the inner wall of said conduit, means normally serving to hold said obturating member away from said seat, and means for establishing a difference of pressures on the opposite sides of said piston in the movement of said obturating member towards said seat.

9. In combination with a fluid conduit comprising a zone of low pressure, less than that in the main portion of said conduit, a valve seat in the vicinity of said zone, an obturating member on the upstream side of said seat engageable with said seat to cut off the passage of fluid through said conduit, said obturating member comprising a plunger exposed at its opposite ends to the pressures in the main part of said conduit and in said zone and an external piston unitary with said plunger, a connection between opposite sides of said piston ensuring equality of the pressures on said opposite sides during normal flow through said conduit with said obturating member spaced from said seat, connections from the upstream and downstream sides of said piston to low pressure and high pressure points respectively of said conduit, valve means controlling said connections, a stationary structure forming with said plunger and piston a body of stream-line form spaced from the inner wall of said conduit, means normally serving to hold said obturating member away from said seat, and means operatively connected to said last mentioned means for operating said valve means.

10. In combination with a fluid conduit including a zone of low pressure, less than that in the main portion of said conduit, a valve seat in the vicinity of said zone, an obturating member on the upstream side of said seat and engageable with said seat to cut off the passage of fluid through said conduit, said obturating member comprising a plunger exposed at its opposite ends to the pressures in the main part of said conduit and in said zone and an external piston unitary with said plunger and exposed on its opposite sides to equal pressures during normal flow through said conduit with said obturating member spaced from said seat, a stationary guiding structure forming with said plunger and piston a body of stream-line form spaced from the inner wall of said conduit, said piston unitary with the outer peripheral wall of said body, and means normally serving to hold said obturating member away from said seat.

In testimony whereof I have signed my name to this specification.

OWEN ALFRED PRICE.